Feb. 28, 1950  E. K. FOOS  2,499,059
HYDRAULIC TRANSMISSION
Filed Dec. 23, 1944  2 Sheets-Sheet 1

Inventor
Edwin K. Foos
By Marichal & Biebel
Attorney

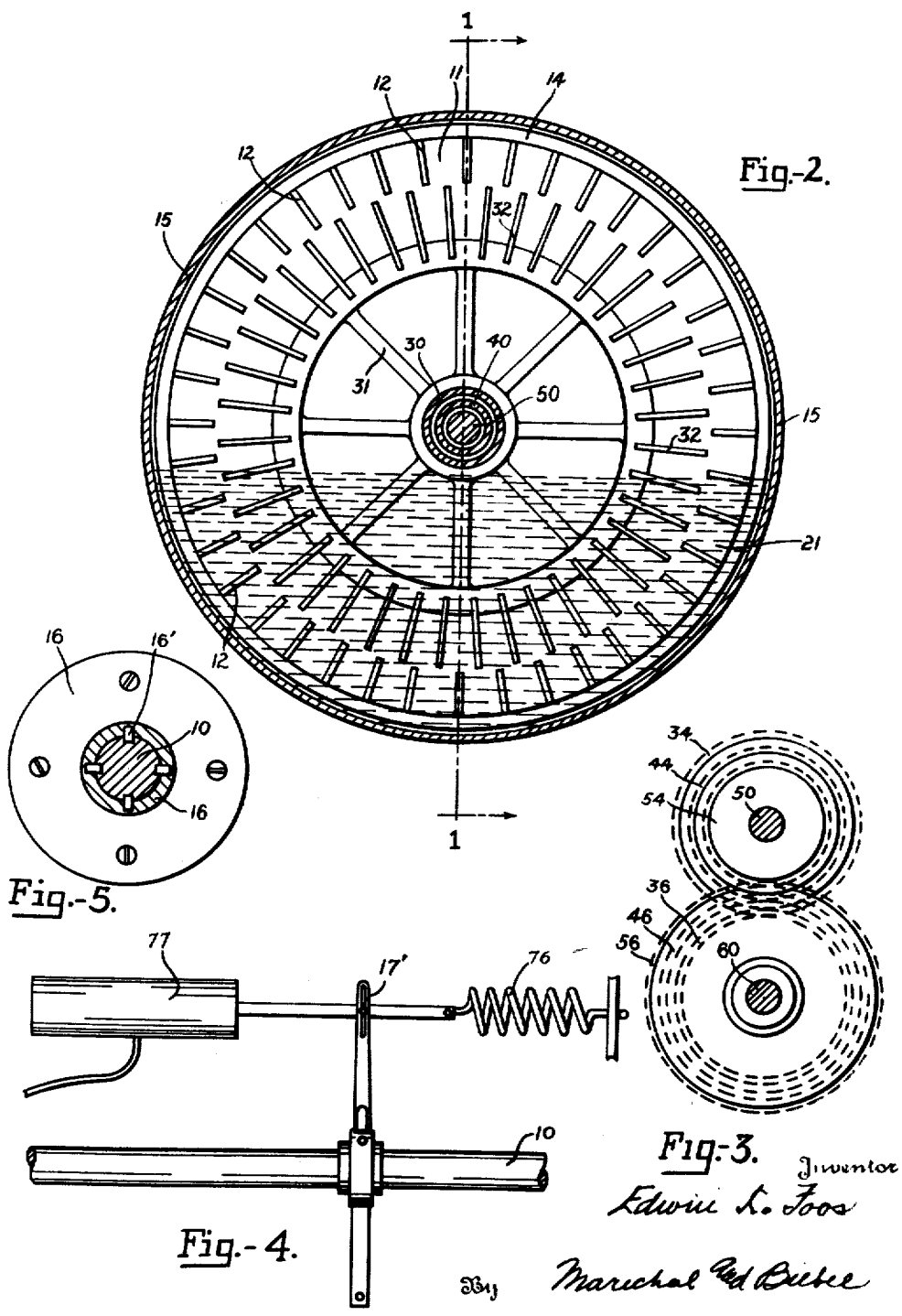

Patented Feb. 28, 1950

2,499,059

UNITED STATES PATENT OFFICE 2,499,059

HYDRAULIC TRANSMISSION

Edwin K. Foos, Yellow Springs, Ohio

Application December 23, 1944, Serial No. 569,542

15 Claims. (Cl. 74—732)

This invention relates to a variable speed, hydraulic power transmission, to a hydraulic clutch, and to a hydraulic gear shift. The machine of my invention is useful as a transmission for automobiles and the invention will be described in a form adaptable to that use, but it is to be understood that the form of the invention so described and the general principles of the invention are useful per se, or with minor adaptation, to static installations in connection with heavy machinery, to marine use, or in any other connection where the transmission of power from a driving source to a driven object through a clutch and speed changing means is desired. The particular description is therefore to be considered an illustration and not a limitation.

It has long been thought desirable to construct a transmission which would operate upon the principles of transmitting power through a fluid medium. Such systems are called hydraulic although the transmitting fluid is seldom aqueous. Heretofore much work has been done over a period of many years to develop hydraulic transmissions but it may be said generally that in all such instances both the development and the success thereof have been seriously handicapped by the fact that the practical working out of the several principles adopted has involved complexities of design, and construction, operation, maintenance and efficiency which have not warranted replacement of the successful mechanical transmissions which are in more general use.

One of the problems which has not been successfully solved, so far as is known, is to make a hydraulic clutch which will be positive in action and simple in design. It is an object of this invention to make such a clutch. Another difficulty which has impaired the development of hydraulic transmissions is that of accomplishing gear shifting by fluid means without employing structures of useless complexity. It is an object of this invention to accomplish the shifting of gears in a hydraulic transmission within the hydraulic clutch itself and by a structure of essential simplicity.

In the automotive field particularly, efforts have been made by engineers for many years to construct transmissions which would shift gears automatically in response to load changes, and several devices of this sort have been placed in operation; most of them relate to mechanical devices. It is an object of this invention to construct a hydraulic transmission which will automatically shift gears in response to load changes, and which can utilize variations in the intake manifold pressure of internal combustion engines for this purpose.

In the automotive field particularly, it is often desirable that the engine should be connected to the driving wheels during deceleration so that it may lend control to the car by acting as a brake. The fluid nature of the driving medium of hydraulic transmissions has made it difficult to maintain the braking action of the engine. This difficulty has led to undesirable complexity of design. It is an object of this invention to construct a hydraulic transmission which may be made to maintain a positive connection between the driving wheels and the engine.

One disadvantage of mechanical transmissions has been the limitation of the transmission to a few gear ratios. In most automobiles the three-speed transmission is standard. Some cars have been made which embodied a four-speed transmission but such transmissions have been abandoned for the reason that the cost, weight, and complexity of the fourth speed overbalances the increase in efficiency. Nevertheless it would be desirable if a transmission of comparative simplicity could be devised which would have a much greater flexibility and a far larger selection of speeds than is possible with a mechanical transmission.

It is an object of this invention to make a hydraulic transmission which may embody as many gear ratios as desired, or as is required by consideration of efficiency, without entraining inefficient complexity of construction, or prohibitive cost.

One difficulty which is still found in automatic transmissions arises from the fact that the shift is not accomplished smoothly but is always accompanied by a jerk which is psychologically unpleasant because the moment at which it occurs cannot be accurately guessed by the occupant of the vehicle. It is an object of this invention to construct a transmission which will accomplish automatic shifting smoothly. Other objects of the invention will be in part apparent and in part set forth from the description of the invention which follows.

In the drawings the invention is illustrated by a construction involving three-gear ratios, but this is given merely for purposes of illustration; it will be apparent that the principles of the invention are applicable to as many gear changes as the engineer desires.

The illustrations in the drawings are diagrammatic and not working drawings, and are described as follows:

Fig. 2 is a vertical sectional view on the line 2—2 of Fig. 1 taken transversely through the clutch case, looking in the direction of the arrows, with a portion of the vane support broken away;

Fig. 3 is a sectional view on the line 3—3 of Fig. 1;

Fig. 4 is a diagrammatic illustration of automatic means for shifting gears; and Fig. 5 is a cross section on the line 5—5 of Fig. 1 looking in the direction of the arrows.

Figure 1:
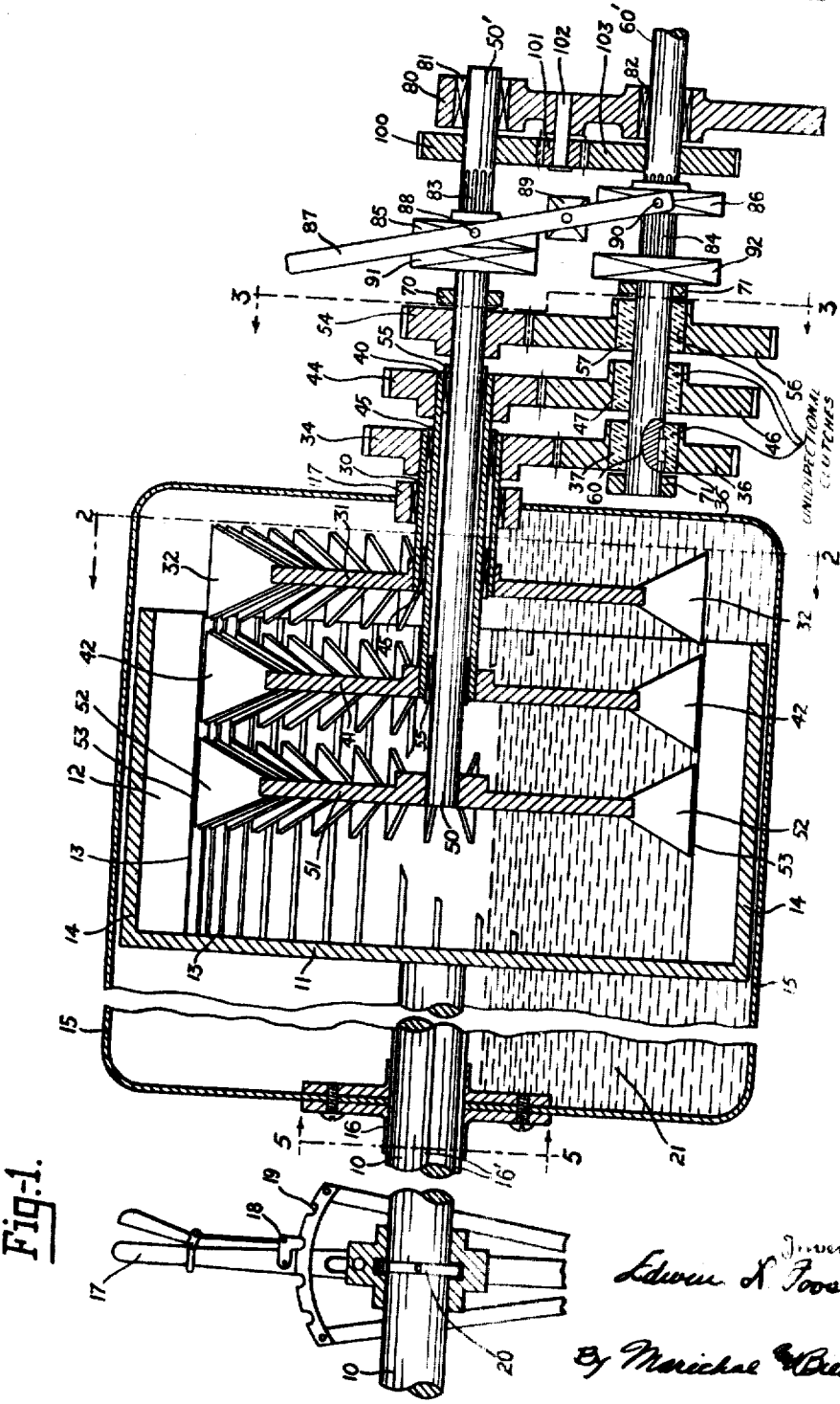
Fig. 1 is a vertical sectional view on the line 1—1 of Fig. 2 taken longitudinally through a transmission embodying the principles of my invention.

Referring now to the numerals in the drawings 10 is a driving shaft which may be rotated by an engine such as an automobile engine. 11 is a circular disk mounted fixedly upon the end of the shaft for rotation therewith from which a cylindrical portion 14 extends within the casing near the wall thereof and from the inner surface of which vanes 12 project forming an impeller, the operation of which is described more fully hereafter. The inner edges of the vanes 12 rotate in a circle concentric with the shaft 10. The showing of vanes found in the drawing is diagrammatic, because there are many vane sections and mountings that could be used; the precise type of vane section and the use of bracing therefor if desirable may be chosen by the engineer in view of the particular services to be performed by a particular installation of apparatus.

Mounted about the driving vanes 12 is a casing 15 having a gland 16 through which the shaft 10 passes, and to which it is keyed by keys 16' so that casing and cylinder 14 rotate together. This casing is longer than the vanes 12 in order that the vanes may be moved longitudinally therewithin. A gear shift lever 17 has a hand operated pawl 18 and ratchet 19 to hold it in selected position. Attached to this gear shift lever is a collar 20 which is seated in an annular groove in the shaft 10. The shaft rotates within the collar and can be moved longitudinally by shifting the lever 17. When the lever is shifted the vanes 12 are moved longitudinally within the casing 15. Within the casing 15 is a body of liquid 21 which may substantially fill the casing in some instances, and in other instances may be present in smaller amount, the general requirement being that enough be present during operation and the conditions of centrifugal force attendant thereon to cover the space between the vanes 12 and the blades which are hereinafter to be described. The depth to which the blades should be covered will depend to some extent upon their shape. Under all circumstances there should be sufficient liquid in the casing to give maximum efficiency of power transmission.

Through the end of the casing opposite the gland 16 and through the bearing 117, which is sealed to prevent the escape of fluid, project three concentric shafts 30, 40, 50. On the inner end of the shaft 50 is mounted a wheel 51 bearing upon its circumference blades 52 which have edges 53 which rotate in a circle which is concentric with the shafts 10 and 50, and is close to the circle in which rotate the edges 13 of the vanes 12. On the other end of the shaft 50 is keyed a gear 54 of comparatively small diameter.

The shaft 40 is hollow and is mounted for rotation about the shaft 50 on bearings 55. On its inner end the shaft 40 carries a wheel 41 having blades 42 corresponding to the blades 52. On its outer end the shaft 40 carries a gear 44 of larger diameter than the gear 54.

The hollow shaft 30 is mounted on and for rotation about the shaft 40 by bearings 45. On its inner end the shaft 30 carries a wheel 31 having blades 32 mounted upon its circumference. On its outer end the shaft 30 carries a gear 34 which is of larger diameter than the gear 44.

The casing 15 has been broken away at the left of Fig. 1 to indicate that it is of greater length than drawing space lets be shown. The casing is of sufficient length to permit the complete disengagement of blades and vanes by retraction of the vanes toward the left end of the casing, as shown in Fig. 1.

In order that the operation of the invention may be made plain, it should now be assumed that the gear shift lever 17 has been moved to the left end of the ratchet as shown in Fig. 1, so that the vanes 12 will not overlap any of the wheels. The motor is now started and the casing 15, the shaft 10, the disk 11, and the vanes 12 are rotated, but being separated from the blades do not produce corresponding rotation in them. By moving the shift lever 17 to the second notch in the ratchet the impeller is caused to telescope the first hydraulically operated wheel 51, the blades of which are driven from the vanes through the thin body of hydraulic fluid that separates their edges; the space between these edges is very small and slippage between them is astonishingly low. There is thus provided in effect a substantially positive driving connection between vanes and blades.

As the blades 52 and their carrying wheel 51 are rotated they turn the shaft 50 and the gear 54. The gear 54 meshes with a gear 56 which is mounted on a driven shaft 60 by a unidirectional clutch 57 which may conveniently be of the free-wheeling type, or of any other well known type which gives a positive drive in one direction and free rotation between the gear and the shaft when, for example, the speed of the shaft exceeds the speed of rotation of the gear and in this instance that prescribed by the ratio of gears 54 and 56. As the gear 54 is turned the gear 56 and the shaft 60 will be turned and power may be taken off the shaft 60. The end of shaft 50 is mounted in bearings in a support 70. Shaft 60 is mounted in bearings 71.

If the operator now moves the gear shift lever forward to the position shown in Fig. 1 the driving vanes 12 will overlap blades 42 as well as blades 52, both of which will be driven in the manner which has just been described. The hydraulically operated wheel 41, as it rotates under the driving impulse of the blades 42 turns the shaft 40 and the gear 44. The gear 44 meshes with a gear 46 which is mounted on the shaft 60 by a unidirectional clutch 47 similar to that numbered 57. The gears 44 and 46 are in a different ratio, and tend to drive the shaft 60 faster than it is driven by gears 54 and 56. Consequently the unidirectional clutch in the gear 56 is thrown out of operating position and the shaft rotates freely within that gear. The fact that the gear 56 is also moving is not a detriment but a help, because it is moving in the same direction and reduces the friction between the shaft and the unidirectional clutch.

When the gear shift lever 17 is moved to the last position on the right in Fig. 1 the vanes 12 are placed in driving relation to blades 32 as well as 42 and 52. As the blades 32 are rotated they turn the hydraulically operated wheel 31, the shaft 30 and the gear 34. The gear 34 meshes with a gear 36 which is preferably fixed to the shaft 60 by a mounting 37. This mounting 37 can be a unidirectional clutch like 47 and 57 to provide "free-wheeling" in all positions of the gear shift lever, which is very desirable for many uses. On the other hand, if the engine is to be used as a brake the connection 37 should be fixed, through use of a key 36' keying the gear 36 to the shaft 60. In that case the engine acts as a brake whenever the blades 32 are in operative relation to the vanes of the impeller. The ratio of gears 34 and 36 is different from that of gears 44 and 46 and gives a higher speed to the shaft 60. Therefore, in this position of the vanes, the shaft 60 is driven from the gear 36 and not from gears 46 or 56, the unidirectional clutches of which permit the shaft 60 to rotate freely within them.

In this invention gear shifting is accomplished smoothly and without shock and without disengaging the motor. In shifting to a higher gear the higher gear chain takes control progressively as the vanes are moved over the blades. In going from a higher to a lower gear the reverse is true, the lower gear, being already in operation, takes over control of the shaft 60 as soon as control is relinquished by the higher gear. It is possible to use as many gears as one chooses in such a system, the only requirements being that additional concentric shafts with their driving and driven members be emplaced, and that the vanes be made of sufficient length to drive all of the blades.

When it is desired to operate the device automatically the shift lever 17' is mounted without ratchet control and is connected on one side to a spring 76 which urges it in one direction and on the other side to a servo motor 77 which is operated by changes in manifold pressure due to variations in load. The servo motor acts against the spring to shift to a lower gear when the load increases, and yields to the spring when the load decreases so that a higher gear will be engaged. In this case the spring will shift the hydraulic clutch into high gear as soon as the load is removed from the servo motor by stopping the engine, thus providing that the engine will always be available as a brake when the engine is not running, or when it is running free in coasting down a hill. During automatic operation the clutch will always remain in engagement unless manually disengaged.

When it is desired to use a reverse gear a clutch mechanism is employed which comprises a support 80 having bearings 81—82 in which are mounted shafts 50' and 60' respectively, the ends of which 83—84 are keyed for the reception of sliding clutch members 85—86. A clutch lever 87 is pivoted at 88 to clutch member 85, at 89 to a support attached to the frame of the machine and at 90 to the lower clutch member 86. Affixed to the end of shaft 50 is a clutch member 91 and affixed to the end of shaft 60 is a clutch member 92. When the mechanism is being driven through the shaft 60 the lever 87 is thrown to the right, as seen in Fig. 1, so that the clutch member 85 does not engage clutch member 91 but clutch member 86 does engage clutch member 92. Drive therefore is transmitted through these clutch members to shaft 60'. When it is desired to throw the machine into reverse the clutch lever 87 is thrown to the position shown in Fig. 1 so that the shaft 50' is driven by the shaft 50 and transmits its motion to a gear 100 which is keyed to shaft 50' and meshes with a gear 101 mounted upon shaft 102 carried by support 80. The gear 101 meshes with a gear 103 which is keyed to the shaft 60' which is driven in reverse. Inasmuch as the higher ratio wheels 31—41 and their gear trains are running free because of the disengagement of clutch 86—92 all the driving effect of the vanes is directed through the wheel 51. The lever 87 may be foot operated in an automobile or hand operated as desired.

This invention embodies not only the advantages which have been implied in the recitation of the objects of the invention but additional advantages springing from the nature of the hydraulic clutch itself apart from its connection to gears. This clutch is smooth but positive in operation, performing its functions without the jerk which is unavoidable in mechanical clutches. It is adaptable to driving a single shaft without a gear shift or to the driving of any number of shafts, as hereinbefore explained.

A particular advantage of the invention is that the gears of a multiple ratio transmission are all continuously in engagement and need not themselves be shifted. The arrangement of unidirectional clutches in the gear box, as above described, contributes materially to the flexibility of the device and the accomplishment of the objects of the invention.

Another advantage of the invention is that the ordinary flywheels and clutch mechanisms of standard automobiles may be done away with. The casing and the rotating body of fluid have enough inertia to perform the function of a flywheel, and the hydraulic clutch replaces the intricacies of the mechanical clutch and gear box with a simpler and more efficient unit which requires no sliding gears for gear shifting.

As many widely different embodiments of this invention may be made without departing from a spirit and scope thereof, it is to be understood that I do not limit myself to the specific embodiments which have been described in this specification except as defined in the appended claims:

1. A variable speed power transmission comprising a driven shaft, means to drive the shaft at different speeds comprising gears operably connected thereto, means to drive the gears comprising hydraulically operated wheels having circularly arranged blades, means to drive the wheels comprising an impeller having vanes operable close to said blades, means to alter the relation of the impeller vanes to the blades of the wheels, and a liquid means for transmitting power from the vanes to the blades.

2. A variable speed power transmission comprising a driven shaft, means to drive the shaft at different speeds comprising gears operably connected thereto by unidirectional clutches, means to drive the gears comprising hydraulically operated wheels having circularly arranged blades, means to drive the wheels comprising an impeller having vanes operable close to said blades, means to alter the relation of the impeller vanes to the blades of the wheels, and means for enclosing said blades and vanes containing a liquid for transmitting power from the vanes to the blades.

3. A variable speed power transmission comprising a driven shaft, means to drive the shaft at different speeds comprising high and low speed gears operably connected thereto whereof the high speed gear is fixedly connected to the shaft and each other gear is operably connected to the shaft by a unidirectional clutch, means to drive the gears comprising hydraulically operated wheels having circularly arranged blades, means to drive the wheels comprising an impeller having vanes operable close to said blades, means to alter the relation of the impeller vanes to the blades of the wheels, and means to transmit power from the vanes to the blades comprising a liquid.

4. A variable speed power transmission comprising a driven shaft, means to drive the shaft at different speeds comprising high and low speed gears operably connected thereto, means to connect the low speed gears to the shaft in driving relation comprising unidirectional clutches, means to drive the gears comprising rotatable wheels having circularly arranged blades, means to drive the wheels comprising an impeller having vanes operable close to said blades, means to alter the relation of the impeller vanes to the blades of the wheels, and a casing containing driving fluid in which are mounted said blades and vanes.

5. A variable speed power transmission comprising a driven shaft, means to drive the shaft at different speeds comprising gears operably connected thereto by unidirectional clutches, means to drive the gears including rotatable wheels operably connected thereto, said wheels having circumferentially arranged blades, means to drive the wheels comprising an impeller having vanes operable close to said blades, means to alter the relation of the impeller vanes to the blades of the wheels, and a casing housing said blades and vanes containing a fluid adapted to transmit power from the vanes to the blades.

6. A variable speed power transmission comprising a driven shaft, means to drive the shaft at different speeds comprising gears separately mounted thereupon by unidirectional clutches, means to drive the gears comprising intermediate gears mounted upon concentric shafts, said shafts bearing hydraulically operated wheels having circumferentially arranged blades, means to drive the wheels comprising an impeller having vanes rotatable about the blades, means to move the impeller blades into and out of operative relation to the blades, and means to transmit power from the vanes to the blades comprising a liquid.

7. A variable speed power transmission comprising a driven shaft, means to drive the shaft at different speeds comprising gears operably connected thereto by means comprising unidirectional clutches, means to drive the gears including hydraulically operated wheels having circumferentially arranged blades, an impeller having circularly arranged vanes, means to telescope the impeller and wheels, and means to transmit power from the impeller to the wheels comprising a liquid.

8. A variable speed power transmission comprising a driven shaft, means to drive the shaft at different speeds comprising gears operably connected thereto by means comprising unidirectional clutches, means to drive the gears including rotatable wheels having circumferentially arranged blades having circularly arranged outer edges, means to drive the wheels comprising an impeller having vanes with circularly arranged inner edges, the circles of said vane and blade edges being of slightly different radius, means to move the impeller into driving relation to each of the wheels, and means to transmit power from the impeller to the wheels comprising a liquid.

9. A variable speed power transmission comprising a driven shaft, means to drive the shaft at different speeds comprising gears operably connected thereto by means comprising unidirectional clutches, means to drive the gears comprising hydraulically operated wheels having circumferentially arranged blades, means to drive the wheels comprising a driving shaft, a disk mounted thereupon, vanes projecting from said disk in circular arrangement, means to move said vanes into driving relation to said blades, and a rotatable casing enclosing said vanes and blades containing a liquid adapted to transmit power from the vanes to the blades.

10. A power transmission apparatus comprising a rotatable casing, circularly arranged vanes within the casing, means to move the vanes longitudinally of the casing, means to rotate the casing and the vanes, a rotatable shaft passing through the casing, blades operably mounted on the shaft in proximity to the vanes, and means to transmit power from the vanes to the blades comprising a liquid.

11. A power transmission apparatus comprising a rotatable casing containing a driving liquid, circularly arranged vanes within the casing, means to move the vanes longitudinally of the casing, means to rotate the casing and the vanes, and means to transmit power from the vanes which comprises rotatable concentric shafts, blades mounted on said shafts for rotation in proximity to said vanes, and gear trains of different ratio driven from said shafts and operably connected in driving relation to a single shaft.

12. Power transmission means comprising a driving and a driven shaft, and means to transmit motion between them comprising a hydraulic clutch having a casing containing driving fluid, a plurality of circularly arranged vanes within said casing connected to the driving shaft, a plurality of hydraulically actuated wheels adjacent to said vanes within the casing, a plurality of gear trains operably connected to said wheels to drive the driven shaft, and means for moving the vanes longitudinally with respect to the wheels to select a particular gear train for driving the said driven shaft.

13. A transmission comprising a plurality of gears operably connected to a shaft by unidirectional clutches, a hydraulic clutch comprising a casing containing a driving fluid, circularly arranged vanes within the casing, means for rotating the vanes, hydraulically actuated wheels adjacent to said vanes within the casing, one of said wheels operably connected to each said gear, and means for moving the vanes longitudinally with respect to the wheels to selectively activate said gears to drive the shaft.

14. A power transmission mechanism comprising a driven shaft, a driving shaft, a rotatable casing mounted on the driving shaft containing driving fluid, an impeller within the casing in driven relation with said driving shaft, a plurality of hydraulically driven wheels mounted within the casing, concentric shafts extending through said casing, each of the said wheels being individually mounted on and keyed to one of the concentric shafts, means for effecting relative axial movement of said impeller and wheels, gear trains of different ratios connecting said concentric shafts to the driven shaft, and unidirectional clutches connecting all of the said gear trains to the driven shaft with the exception of the gear train providing the highest speed to the driven shaft for a given speed of the driving shaft.

15. A power transmission mechanism comprising a driven shaft, an intermediate shaft, a driving shaft, a rotatable casing mounted on the driving shaft containing driving fluid, an impeller within the casing in driven relation with said driving shaft, a plurality of hydraulically driven wheels mounted within said casing, concentric shafts extending through said casing, each said wheel being individually mounted on and in driven relation with one of said concentric shafts, means for effecting relative axial movement of said impeller and wheels, gear trains of different ratios connecting the concentric shafts to the intermediate shaft, unidirectional clutches connecting all of the gear trains to the intermediate shaft with the exception of the gear train providing the highest speed to the intermediate shaft for a given speed of the driving shaft, a reversing gear train, and manually controlled clutches for effectively selective connections between the intermediate shaft and the driven shaft and between said reversing gear train and one of the concentric shafts.

EDWIN K. FOOS.

REFERENCES CITED

The following references are of record in the file of this patent:

UNITED STATES PATENTS

| Number | Name | Date |
| --- | --- | --- |
| 1,551,055 | Rieseler | Aug. 25, 1925 |
| 1,672,232 | Saives | June 5, 1928 |
| 1,778,365 | Littlejohn | Oct. 14, 1930 |
| 2,055,895 | Fawcett | Sept. 29, 1936 |
| 2,297,259 | Speiser | Sept. 29, 1942 |
| 2,318,660 | Barrett | May 11, 1943 |
| 2,321,226 | McKay | June 8, 1943 |
| 2,322,479 | Schjolin | June 22, 1943 |
| 2,427,432 | Wilhelmy | Sept. 16, 1947 |